US012100348B2

(12) United States Patent
Qiu

(10) Patent No.: US 12,100,348 B2
(45) Date of Patent: Sep. 24, 2024

(54) PIXEL CIRCUIT AND DRIVING METHOD THEREOF, DISPLAY PANEL, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Yuanyou Qiu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/910,605

(22) PCT Filed: Nov. 2, 2021

(86) PCT No.: PCT/CN2021/128203

§ 371 (c)(1),
(2) Date: Sep. 9, 2022

(87) PCT Pub. No.: WO2022/156306

PCT Pub. Date: Jul. 28, 2022

(65) Prior Publication Data

US 2023/0136129 A1 May 4, 2023

(30) Foreign Application Priority Data

Jan. 25, 2021 (CN) ......................... 202110098456.6

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01);
(Continued)

(58) Field of Classification Search
CPC ...... G09G 3/2074; G09G 3/32; G09G 3/3208; G09G 3/3233; G09G 2300/043;
(Continued)

(56) References Cited

U.S. PATENT DOCUMENTS 10,083,658 B2 * 9/2018 Wang .................. G09G 3/3233
11,830,427 B2 * 11/2023 Liu ...................... G09G 3/3266
(Continued)

FOREIGN PATENT DOCUMENTS

CN 101449314 A 6/2009
CN 104715724 A 6/2015
(Continued)

OTHER PUBLICATIONS

First Office Action for Chinese Patent Application No. 202110098456.6 issued by the Chinese Patent Office on Sep. 17, 2021.
(Continued)

*Primary Examiner* — Julie Anne Watko

(57) ABSTRACT

A pixel circuit includes: a driving circuit configured to transmit a first initial signal received at a first initial signal terminal to a control node in response to a first reset signal received at a first reset signal terminal, write a data signal received at a data signal terminal in response to a scan signal received at a scan signal terminal, generate a driving signal according to a first voltage of a first voltage terminal and the data signal in response to an enable signal received at an enable signal terminal, and output the driving signal to an element to be driven; and a control circuit configured to transmit a control signal received at a control signal terminal to the control node in response to a voltage of the control
(Continued)

node, so as to control a turned-on duration of the element to be driven in conjunction with the driving signal.

16 Claims, 9 Drawing Sheets

(52) U.S. Cl.
CPC ............... *G09G 2300/0842* (2013.01); *G09G 2300/0861* (2013.01); *G09G 2310/0251* (2013.01); *G09G 2310/061* (2013.01); *G09G 2310/08* (2013.01); *G09G 2320/0233* (2013.01); *G09G 2320/0242* (2013.01); *G09G 2320/045* (2013.01)

(58) Field of Classification Search
CPC ... G09G 2300/0819; G09G 2300/0842; G09G 2300/0861; G09G 2310/0251; G09G 2310/0262; G09G 2310/061; G09G 2310/08; G09G 2320/0233; G09G 2320/0242; G09G 2320/045
USPC .................................................. 345/215, 214
See application file for complete search history.

(56) References Cited

U.S. PATENT DOCUMENTS

| | | | |
|---|---|---|---|
| 2009/0206764 | A1 | 8/2009 | Schemmann et al. |
| 2016/0314742 | A1 | 10/2016 | Zhou |
| 2017/0169764 | A1 | 6/2017 | Lee et al. |
| 2018/0047336 | A1 | 2/2018 | Chen et al. |
| 2018/0190191 | A1 | 7/2018 | Zhai et al. |
| 2018/0357962 | A1 | 12/2018 | Feng |
| 2019/0266941 | A1 | 8/2019 | Pyo et al. |
| 2022/0093045 | A1 | 3/2022 | Huangfu et al. |

FOREIGN PATENT DOCUMENTS

| | | | |
|---|---|---|---|
| CN | 106067291 | A | 11/2016 |
| CN | 106157880 | A | 11/2016 |
| CN | 106782304 | A | 5/2017 |
| CN | 107731161 | A | 2/2018 |
| CN | 110223633 | A | 9/2019 |
| CN | 110473501 | A | 11/2019 |
| CN | 110992891 | A | 4/2020 |
| CN | 111696484 | A | 9/2020 |
| CN | 111833817 | A | 10/2020 |
| CN | 111986620 | A | 11/2020 |
| CN | 112037716 | A | 12/2020 |
| CN | 112863428 | A | 5/2021 |

OTHER PUBLICATIONS

Notification to Grant Patent Right for Invention for Chinese Patent Application No. 202110098456.6 issued by the Chinese Patent Office on Mar. 29, 2022.

* cited by examiner (A)

(B)

PIXEL CIRCUIT AND DRIVING METHOD THEREOF, DISPLAY PANEL, AND DISPLAY DEVICE

CROSS-REFERENCE TO RELATED APPLICATIONS

The application is a national phase entry under 35 USC 371 of International Patent Application No. PCT/CN2021/128203, filed on Nov. 2, 2021, which claims priority to Chinese Patent Application No. 202110098456.6, filed on Jan. 25, 2021, which are incorporated herein by reference in their entirety.

TECHNICAL FIELD

The present disclosure relates to the field of display technologies, and in particular, to a pixel circuit and a driving method thereof, a display panel, and a display device.

BACKGROUND

The display market is currently booming, and as the consumer demand for various display products such as laptops, smart phones, televisions, tablet computers, smart watches, and fitness wristbands continues to increase, more new display products will emerge in future.

SUMMARY

In an aspect, a pixel circuit is provided. The pixel circuit includes a driving circuit and a control circuit. The driving circuit is coupled to at least a first reset signal terminal, a first initial signal terminal, a scan signal terminal, a data signal terminal, a first voltage terminal, an enable signal terminal and a control node. The control circuit is coupled to a control signal terminal and the control node. The driving circuit is configured to: transmit a first initial signal received at the first initial signal terminal to the control node in response to a first reset signal received at the first reset signal terminal, write a data signal received at the data signal terminal in response to a scan signal received at the scan signal terminal, generate a driving signal according to a first voltage of the first voltage terminal and the written data signal in response to an enable signal received at the enable signal terminal, and output the driving signal to an element to be driven that is coupled to the control node. The control circuit is configured to transmit a control signal received at the control signal terminal to the control node in response to a voltage of the control node, so as to control a turned-on duration of the element to be driven in conjunction with the driving signal.

In some embodiments, the control circuit includes a first transistor. A control electrode of the first transistor is coupled to the control node, a second electrode of the first transistor is coupled to the control node, and a first electrode of the first transistor is coupled to the control signal terminal.

In some embodiments, the first reset circuit is a P-type transistor. A voltage of the control signal received by the control circuit is greater than a voltage of the first initial signal received by the driving circuit.

In some embodiments, the driving circuit includes a first reset sub-circuit. The first reset sub-circuit is coupled to the first reset signal terminal, the first initial signal terminal and the control node. The first reset sub-circuit is configured to transmit the first initial signal received at the first initial signal terminal to the control node in response to the first reset signal received at the first reset signal terminal.

In some embodiments, the first reset sub-circuit includes a second transistor. A control electrode of the second transistor is coupled to the first reset signal terminal, a first electrode of the second transistor is coupled to the first initial signal terminal, and a second electrode of the second transistor is coupled to the control node.

In some embodiments, the driving circuit includes a driving sub-circuit and a data writing sub-circuit. The driving sub-circuit includes a driving transistor and a capacitor. A first terminal of the capacitor is coupled to the first voltage terminal, and a second terminal of the capacitor is coupled to a control electrode of the driving transistor. The data writing sub-circuit is coupled to the scan signal terminal, the data signal terminal and the driving sub-circuit. The data writing sub-circuit is configured to write the data signal received at the data signal terminal into the driving sub-circuit in response to the scan signal received at the scan signal terminal. The driving sub-circuit is configured to generate the driving signal according to the written data signal and the first voltage of the first voltage terminal.

In some embodiments, the data writing sub-circuit includes a third transistor. A control electrode of the third transistor is coupled to the scan signal terminal, a first electrode of the third transistor is coupled to the data signal terminal, and a second electrode of the third transistor is coupled to a first electrode of the driving transistor.

In some embodiments, the driving circuit further includes a driving control sub-circuit. The driving control sub-circuit is coupled to the enable signal terminal, the first voltage terminal, the driving sub-circuit and the control node. The driving control sub-circuit is configured to cause the driving sub-circuit to form a conductive path with the first voltage terminal and the control node in response to the enable signal received at the enable signal terminal.

In some embodiments, the driving control sub-circuit further includes a fourth transistor and a fifth transistor. A control electrode of the fourth transistor is coupled to the enable signal terminal, a first electrode of the fourth transistor is coupled to the first voltage terminal, and a second electrode of the fourth transistor is coupled to a first electrode of the driving transistor. A control electrode of the fifth transistor is coupled to the enable signal terminal, a first electrode of the fifth transistor is coupled to a second electrode of the driving transistor, and a second electrode of the fifth transistor is coupled to the control node.

In some embodiments, the driving circuit further includes a compensation sub-circuit. The compensation sub-circuit is coupled to the scan signal terminal and the driving sub-circuit. The compensation sub-circuit is configured to write the data signal and a threshold voltage of the driving transistor in the driving sub-circuit into the control electrode of the driving transistor in response to the scan signal received at the scan signal terminal.

In some embodiments, the compensation sub-circuit includes a sixth transistor. A control electrode of the sixth transistor is coupled to the scan signal terminal, a first electrode of the sixth transistor is coupled to the second electrode of the driving transistor, and a second electrode of the sixth transistor is coupled to the control electrode of the driving transistor.

In some embodiments, the driving circuit further includes a second reset sub-circuit. The second reset sub-circuit is coupled to a second reset signal terminal, a second initial signal terminal and the driving sub-circuit. The second reset sub-circuit is configured to transmit a second initial signal received at the second initial signal terminal to the driving sub-circuit in response to a second reset signal received at the second reset signal terminal.

In some embodiments, the second reset sub-circuit includes a seventh transistor. A control electrode of the seventh transistor is coupled to the second reset signal terminal, a first electrode of the seventh transistor is coupled to the second initial signal terminal, and a second electrode of the seventh transistor is coupled to the driving sub-circuit.

In another aspect, a display panel is provided. The display panel includes the pixel circuits according to any one of the above embodiments and elements to be driven. The elements to be driven are each coupled to a pixel circuit of the pixel circuits and a second voltage terminal.

In some embodiments, the display panel further includes a plurality of control signal lines. The control signal terminal of the pixel circuit is coupled to a control signal line of the plurality of control signal lines. The plurality of control signal lines are configured to transmit control signals.

In some embodiments, the display panel includes a plurality of sub-pixels. A sub-pixel of the plurality of sub-pixels includes one of the pixel circuits and one of the elements to be driven. Pixel circuits in sub-pixels of a same color are coupled to a same control signal line.

In yet another aspect, a display device is provided. The display device includes the display panel as described in any one of the above embodiments and a driver chip. The driver chip is coupled to the display panel. The driver chip is configured to provide signals for the display panel.

In yet another aspect, a driving method of a pixel circuit is provided. The pixel circuit includes a driving circuit and a control circuit. The driving circuit is coupled to at least a first reset signal terminal, a first initial signal terminal, a scan signal terminal, a data signal terminal, a first voltage terminal, an enable signal terminal and a control node. The control circuit is coupled to a control signal terminal and the control node. The driving method includes: transmitting, by the driving circuit, a first initial signal received at the first initial signal terminal to the control node in response to a first reset signal received at the first reset signal terminal; writing, by the driving circuit, a data signal received at the data signal terminal in response to a scan signal received at the scan signal terminal; generating, by the driving circuit, a driving signal according to a first voltage of the first voltage terminal and the written data signal in response to an enable signal received at the enable signal terminal; outputting, by the driving circuit, the driving signal to an element to be driven that is coupled to the control node; and transmitting, by the control circuit, a control signal received at the control signal terminal to the control node in response to a voltage of the control node, so as to control a turned-on duration of the element to be driven in conjunction with the driving signal.

In some embodiments, a voltage of the control signal is greater than a voltage of the first initial signal.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these accompanying drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Figure 1:
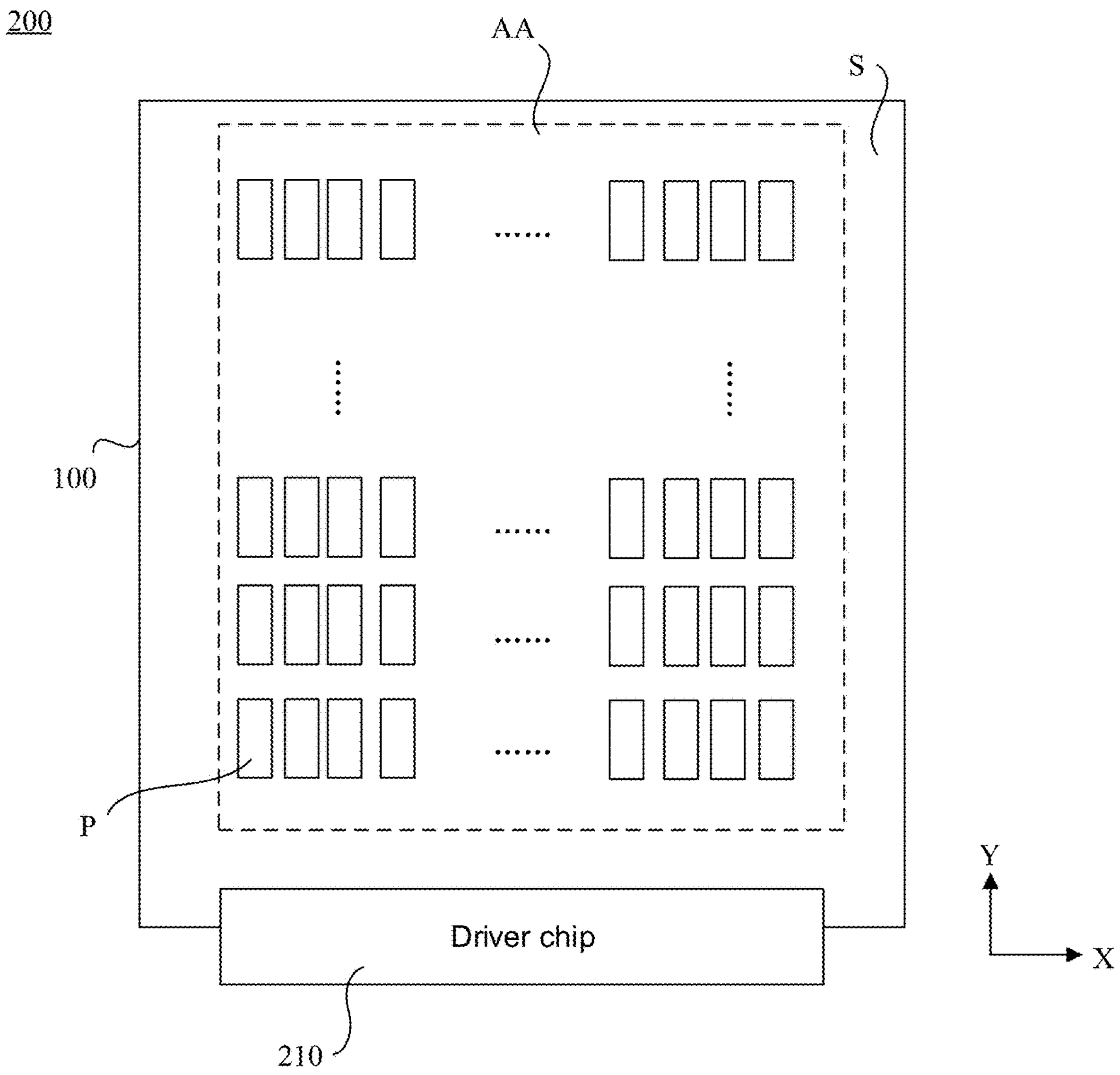
FIG. 1 is a schematic diagram showing a structure of a display device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the content herein.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

As used herein, the term "about" or "approximately" includes a stated value and an average value within an acceptable deviation range of a specific value. The acceptable deviation range is determined by a person of ordinary skill in the art in view of the measurement in question and the error associated with the measurement of a particular quantity (i.e., limitations of the measurement system).

Some embodiments of the present disclosure provide a display device. For example, the display device may be any device that displays an image whether moving (e.g., a video) or stationary (e.g., a static image), and whether textual or graphical. More specifically, the display device may be one of a variety of electronic devices, and the described embodiments may be implemented in or associated with a variety of electronic devices. The variety of electronic devices may include (but are not limit to), for example, mobile telephones, wireless devices, personal data assistants (PDA), hand-held or portable computers, global positioning system (GPS) receivers/navigators, cameras, MPEG-4 Part 14 (MP4) video players, video cameras, game consoles, watches, clocks, calculators, television (TV) monitors, flat-panel displays, computer monitors, car displays (e.g., odometer displays), navigators, cockpit controllers and/or displays, camera view displays (e.g., displays of rear view cameras in vehicles), electronic photos, electronic billboards or signs, projectors, architectural structures, and packagings and aesthetic structures (e.g., displays for displaying an image of a piece of jewelry). The embodiments of the present disclosure do not particularly limit a specific form of the display device.

In some embodiments of the present disclosure, as shown in FIG. 1, the display device 200 includes a display panel 100. The display panel 100 has a display area AA and a peripheral area S. The peripheral area S is located on at least one side of the display area AA.

The display panel 100 includes a plurality of sub-pixels P disposed in the display area AA. For example, the plurality of sub-pixels P may be arranged in an array. For example, sub-pixels P arranged in a line in a first direction X in FIG. 1 are referred to as sub-pixels in a same row, and sub-pixels P arranged in a line in a second direction Y in FIG. 1 are referred to as sub-pixels in a same column. For example, the plurality of sub-pixels include sub-pixels of a first color, sub-pixels of a second color, and sub-pixels of a third color. For example, the first color, the second color and the third color are three primary colors. For example, the first color, the second color and the third color are red, green and blue, respectively. That is, the plurality of sub-pixels P include red sub-pixels, green sub-pixels and green sub-pixels.

Figure 2:
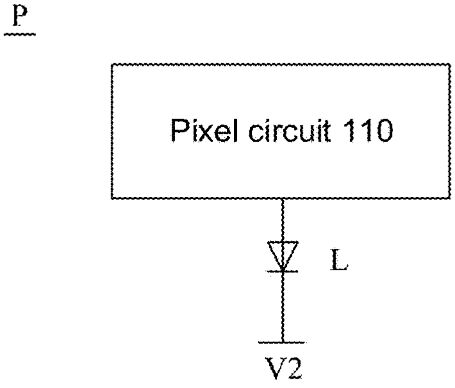
FIG. 2 is a schematic diagram showing a structure of a sub-pixel, in accordance with some embodiments.

In some embodiments, the display panel further includes elements to be driven. As shown in FIG. 2, each sub-pixel P includes a pixel circuit 110 and an element L to be driven. The pixel circuit 110 is coupled to the element L to be driven. The pixel circuit 110 is used for providing a driving signal for the element L to be driven, so as to drive the element L to be driven to operate.

For example, the element to be driven is further coupled to a second voltage terminal. For example, referring to FIG. 2, a first electrode of the element L to be driven is coupled to the pixel circuit 110, and a second electrode of the element L to be driven is coupled to the second voltage terminal V2. For example, the second voltage terminal V2 is configured to transmit a direct current (DC) voltage signal, e.g., a DC low voltage. For example, a second voltage of the second voltage terminal V2 is −3 V.

For example, the element to be driven includes a current-driven type device. Further, the element to be driven may adopt a current-type light-emitting diode, such as a micro light-emitting diode (Micro LED), a mini light-emitting diode (Mini LED), an organic light-emitting diode (OLED), or a quantum dot light-emitting diode (QLED). For example, the first electrode and the second electrode of the element to be driven are the anode and the cathode of the light-emitting diode, respectively.

The display panel further includes a base substrate, and the pixel circuit and the element to be driven are both located on the base substrate. For example, the base substrate may include: a rigid substrate such as a glass substrate (or referred to as a hard substrate), or a flexible substrate such as a polyimide (PI) substrate; the base substrate may further include a film such as a buffer layer disposed on the rigid substrate or the flexible substrate.

Figure 3:
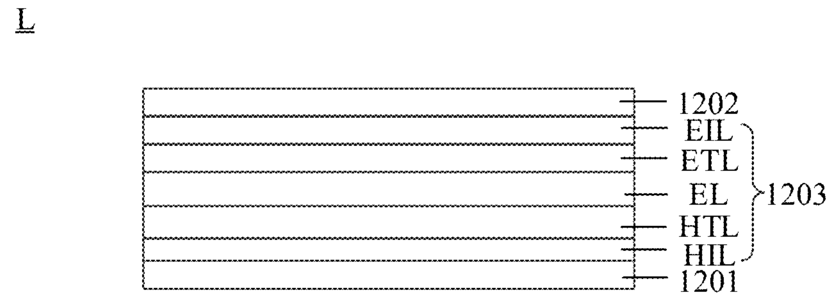
FIG. 3 is a schematic diagram showing a structure of an element to be driven, in accordance with some embodiments.

In some examples, the element L to be driven is a light-emitting device. For example, the light-emitting device may be a current-driven light-emitting device including a light-emitting diode (LED), an OLED or a QLED. For example, as shown in FIG. 3, the light-emitting device L includes a cathode 1202 and an anode 1201, and a light-emitting functional layer 1203 located between the cathode 1202 and the anode 1201. The light-emitting functional layer 1203 may include, for example, a light-emitting layer EL, a hole transport layer HTL located between the light-emitting layer EL and the anode 1201, and an electron transport layer ETL located between the light-emitting layer EL and the cathode 1202. Of course, according to needs, in some embodiments, a hole injection layer HIL may be provided between the HTL and the anode, and an electron injection layer EIL may be provided between the ETL and the cathode 1202.

For example, the anode may be made of a transparent conductive material with a high work function, and the material of the anode may include indium tin oxide (ITO), indium zinc oxide (IZO), indium gallium oxide (IGO), gallium zinc oxide (GZO), zinc oxide (ZnO), indium oxide (In2O3), aluminum zinc oxide (AZO), or a carbon nanotube; the cathode may be made of a material with a high conductivity and a low work function, and the material of the cathode may include an alloy such as a magnesium aluminum (MgAl) alloy or a lithium aluminum (LiAl) alloy, or a simple metal such as magnesium (Mg), aluminum (Al), lithium (Li) or silver (Ag). A material of the light-emitting layer may be selected according to different colors of light emitted by the light-emitting layer. For example, the material of the light-emitting layer includes a fluorescent light-emitting material or a phosphorescent light-emitting material. For example, in at least one embodiment of the present disclosure, the light-emitting layer may adopt a doping system. That is, a dopant material is mixed into a host light-emitting material to obtain a usable light-emitting material. For example, the host light-emitting material may be a metal compound material, a derivative of anthracene, an aromatic diamine compound, a triphenylamine compound, an aromatic triamine compound, a derivative of biphenyldiamine, or a triarylamine polymer.

In a process of manufacturing the element to be driven (e.g., the light-emitting device), due to the limitation of process conditions, thicknesses of the film layers of different elements to be driven varies, which easily affects the uniformity of the display. For example, in a process of manufacturing light-emitting functional layers in light-emitting devices by using an evaporation process, thicknesses of the light-emitting functional layers are not controlled to a reasonable thickness ratio, so that the difference in turned-on voltages of the light-emitting devices in the display panel is too large. As a result, in a display process, for example, in a process of displaying low gray scales, the display panel has a serious color shift, which reduces the display effect.

Figure 4:
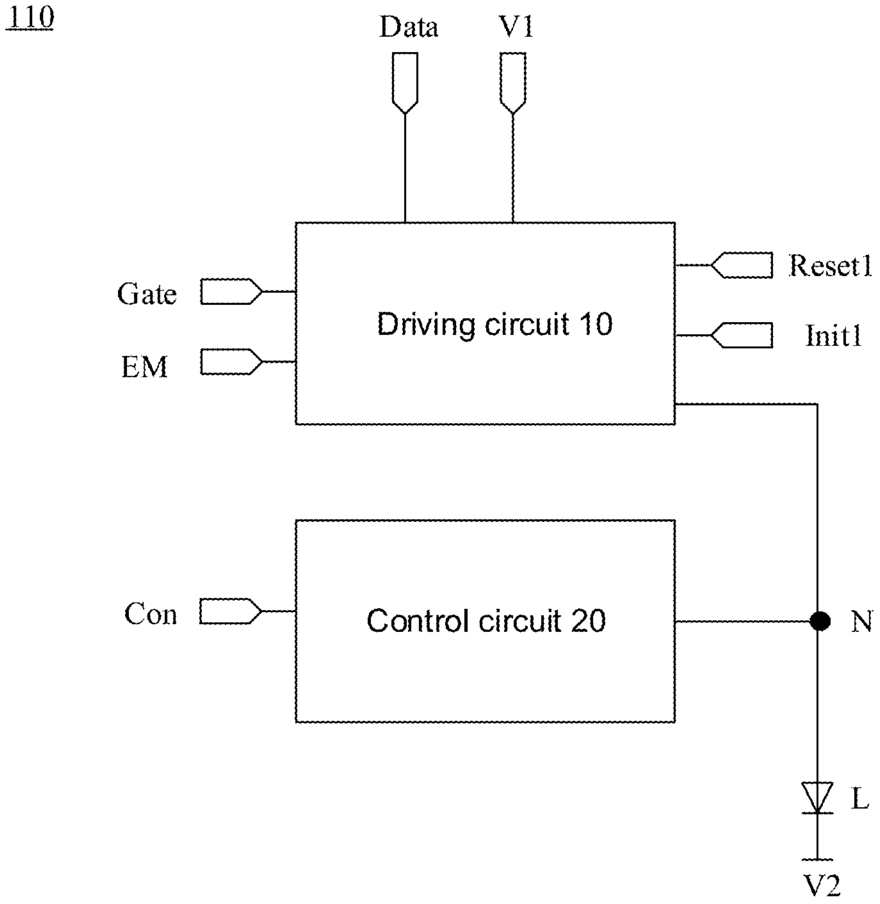
FIG. 4 is a schematic diagram showing a structure of a pixel circuit, in accordance with some embodiments.

As shown in FIG. 4, the pixel circuit 110 provided in the embodiments of the present disclosure includes a driving circuit 10 and a control circuit 20. The driving circuit 10 is coupled to at least a first reset signal terminal Reset1, a first initial signal terminal Init1, a scan signal terminal Gate, a data signal terminal Data, a first voltage terminal V1, an enable signal terminal EM and a control node N. The control circuit 20 is coupled to the control signal terminal Con and the control node N.

The driving circuit 10 is configured to: transmit a first initial signal received at the first initial signal terminal Init1 to the control node N in response to a first reset signal received at the first reset signal terminal Reset1; write a data signal received at the data signal terminal Data in response to a scan signal received at the scan signal terminal Gate; generate a driving signal according to a first voltage of the first voltage terminal V1 and the written data signal in response to an enable signal received at the enable signal terminal EM; and output the driving signal to the element L to be driven coupled to the control node N. The control circuit 20 is configured to transmit a control signal received at the control signal terminal Con to the control node N in response to a voltage of the control node N, so as to control a turned-on duration of the element L to be driven in conjunction with the driving signal.

The turned-on duration of the element L to be driven described herein may be understood as, a duration between a start moment at which the enable signal is at an active level (which is regarded as a start moment at which the element L to be driven is in an operation phase (e.g., a third phase of an image frame in the following)) and a moment at which the element L to be driven is turned on.

In the circuits provided in the embodiments of the present disclosure, nodes do not represent actual components, but rather represent junctions of relevant electrical connections in a circuit diagram. That is, the nodes are nodes equivalent to the junctions of the relevant electrical connections in the circuit diagram. For example, a junction of the driving circuit, the control circuit and the element to be driven is equivalent to the control node.

For example, the first voltage received at the first voltage terminal is a DC voltage, e.g., a DC high voltage. For example, the first voltage of the first voltage terminal V1 is 7 V.

In addition, a voltage of the first initial signal and a voltage of the control signal may be selected according to actual situations, which are not limited herein. For example, the first initial signal may be a DC signal. For example, the first initial signal may be a high-level signal or a low-level signal. For example, the control signal may be a DC signal. For example, the control signal may be a high-level signal or a low-level signal. For example, the voltage of the control signal is greater than the voltage of the first initial signal.

In this case, the driving circuit 10 transmits the first initial signal to the control node N, so that the first initial signal initializes the control node N, and the voltage of the control node N is the voltage of the first initial signal. The control circuit 20 transmits the control signal to the control node N according to the voltage of the control node N to charge the control node N, so that the voltage of the control node N is changed. Therefore, the voltage of the control node N gradually rises from the voltage of the first initial signal to the voltage of the control signal. In this way, in a process when the driving circuit 10 transmits the driving signal to the control node N, compared with a case where the voltage of the control node N starts to rise from the voltage of the first initial signal, the voltage of the control node N rises faster in a case where the voltage of the control node N starts to rise from the voltage of the control signal. As a result, a voltage difference between the first electrode and the second electrode of the element L to be driven may quickly reach the requirement of the turned-on voltage of the element L to be driven, which may shorten the turned-on duration of the element L to be driven, avoid the difference of brightness ratios of all the sub-pixels and the color shift due to the large difference of the turned-on durations of the elements L to be driven in the sub-pixels.

Therefore, for the pixel circuit 110 provided in the embodiments of the present disclosure, in the process when the driving circuit 10 transmits the driving signal to the control node N, the voltage of the control node N may gradually rise from the voltage of the control signal, and the voltage of the control node N rises faster compared with a case where the voltage of the control node N starts to rise from the voltage of the first initial signal. As a result, the voltage difference between the first electrode and the second electrode of the element L to be driven may quickly reach the requirement of the turned-on voltage of the element L to be driven, which may shorten the turned-on duration of the element L to be driven, avoid the difference of brightness ratios of all the sub-pixels and the problem of color shift due to the large difference of the turned-on durations of the elements L to be driven in the sub-pixels, thereby improving the display effect of the display device.

Figure 6A:
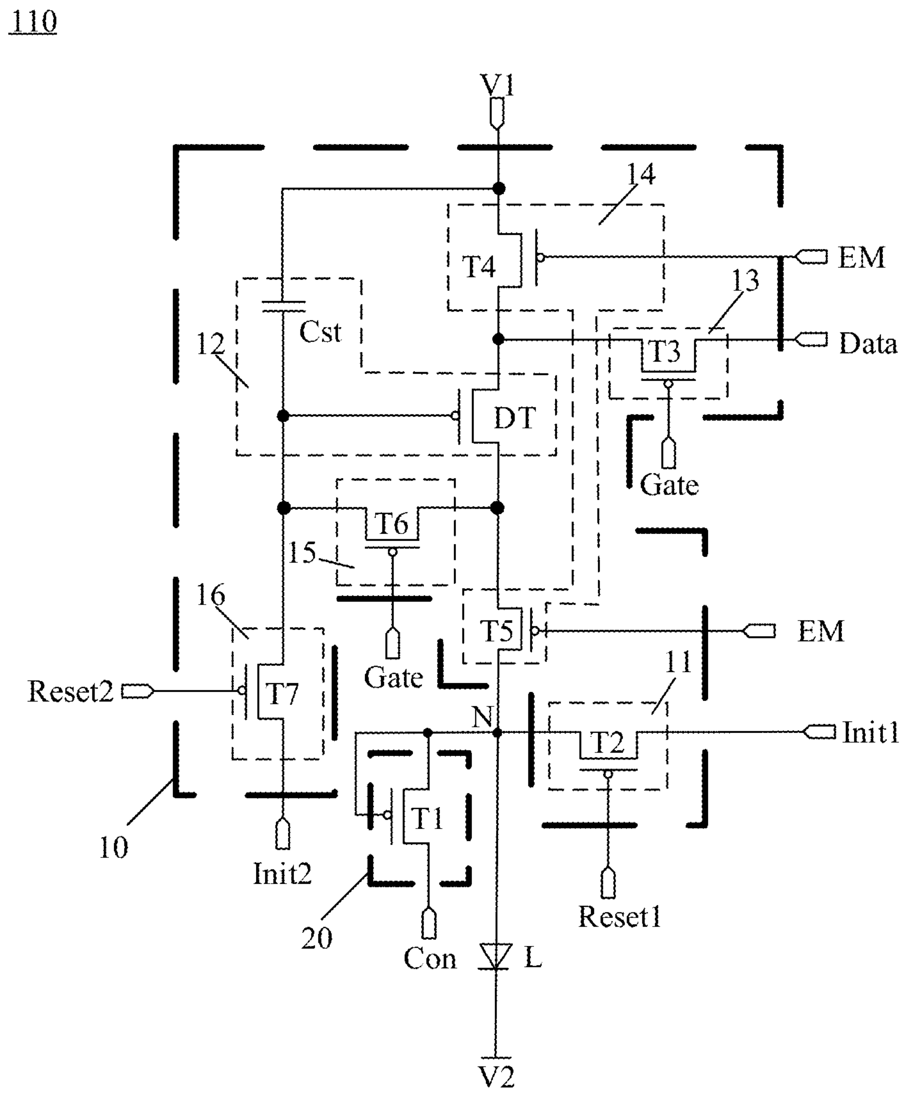
FIG. 6A is a circuit diagram of a pixel circuit, in accordance with some embodiments.

For example, as shown in FIG. 6A, the control circuit 20 includes a first transistor T1. A control electrode and a second electrode of the first transistor T1 are coupled to the control node N, and a first electrode of the first transistor T1 is coupled to the control to signal terminal Con. In this way, in a case where the first transistor T1 is turned on, the first transistor T1 may transmit the control signal to the control node N.

In some embodiments, the first transistor T1 is a P-type transistor.

The first electrode of the element L to be driven is coupled to the control node N, and the second electrode of the first transistor T1 is coupled to the first electrode of the element L to be driven. In this way, the first transistor T1 may transmit the control signal to the first electrode of the element L to be driven, so as to control a voltage of the first electrode of the element L to be driven. For example, in a case where the voltage of the control node N is greater than the voltage of the control signal, the second electrode of the first transistor T1 serves as the source of the first transistor T1, and the first electrode of the first transistor T1 serves as the drain of the first transistor T1; in a case where the voltage of the control node N is less than the voltage of the control signal, the first electrode of the first transistor T1 serves as the source of the first transistor T1, and the second electrode of the first transistor T1 serves as the drain of the first transistor T1.

For example, the voltage $V_{con}$ of the control signal of the control signal terminal Con is greater than the voltage $V_{init1}$ of the first initial signal of the first initial signal terminal Init1, that is, $V_{Con}$ is greater than $V_{init1}$ ($V_{Con}>V_{init1}$). For example, the voltage $V_{Con}$ of the control signal is in a range of −3 V to −1 V inclusive, such as −3 V, −2.5 V, −2 V, −1.5 V or −1 V; the voltage $V_{init1}$ of the first initial signal is in a range of −6 V to −2 V inclusive, such as −6 V, −5.5 V, −5 V, −4.5 V or −2 V.

In this case, the voltage of the control electrode of the first transistor T1 is the voltage of the initial signal, and the voltage of the first electrode of the first transistor T1 is the voltage of the control signal. In a case where the first transistor T1 is a P-type transistor, the voltage $V_{init1}$ of the first initial signal is −3.5 V, the voltage $V_{Con}$ of the control signal is −1.3 V, the voltage of the control electrode (i.e., the gate) of the first transistor is −3.5 V, and the voltage of the first electrode (i.e., the source) of the first transistor T1 is −1.3 V. Thus, a voltage difference between the control electrode and the first electrode of the first transistor T1 is −2.2 V. That is, a gate-source voltage difference of the first transistor T1 is −2.2 V. For example, a threshold voltage of the first transistor T1 is −2.0 V, and the gate-source voltage difference of the first transistor T1 is −2.2 V, so that the first transistor T1 is turned on and transmits the control signal to the control node N, and the voltage of the control node N rises. Since a difference between the gate-source voltage difference of the first transistor T1 and the threshold voltage thereof is small, the first transistor T1 is not in a fully turned-on state, and a magnitude of a current passing through the first transistor T1 may be in a picoampere (pA) level. However, a magnitude of a current passing through the first transistor T1 in a fully turned-on state may be in a microampere (pA) level. Therefore, the first transistor T1 may gradually charge the control node N according to the control signal, so that the voltage of the control node N rises slowly, and charging time of the control node N by the control signal is relatively long.

At the start moment when the first transistor T1 is turned-on, the voltage difference between the first electrode and the second electrode of the first transistor T1 (i.e., a voltage difference between the control signal and the first initial signal (i.e., $V_{Con}-W_{Init1}$)) is the largest. As the voltage of the control node N continues to rise, the voltage difference between the first electrode and the second electrode of the first transistor T1 will gradually decrease, and the current passing through the first transistor T1 will also gradually decrease in a process when the first transistor T1 transmits the control signal to the control node N. In the process when the driving signal is transmitted to the control node N, the driving signal may charge the control node N, so that the voltage of the control node N rises. In a case where an absolute value of the voltage difference between the control electrode and the first electrode of the first transistor T1 is less than an absolute value of the threshold voltage of the first transistor T1, the voltage of the control node N is greater than the voltage of the first initial signal. Since the gate-source voltage difference of the first transistor T1 is a voltage difference between the control electrode and the second electrode of the first transistor T1, the gate-source voltage difference of the first transistor T1 is 0 V, which is less than an absolute value of the threshold value of the first transistor T1. Thus, the first transistor T1 is in a turned-off state, and a charging process of the control node N by the control signal is ended.

Figure 5:
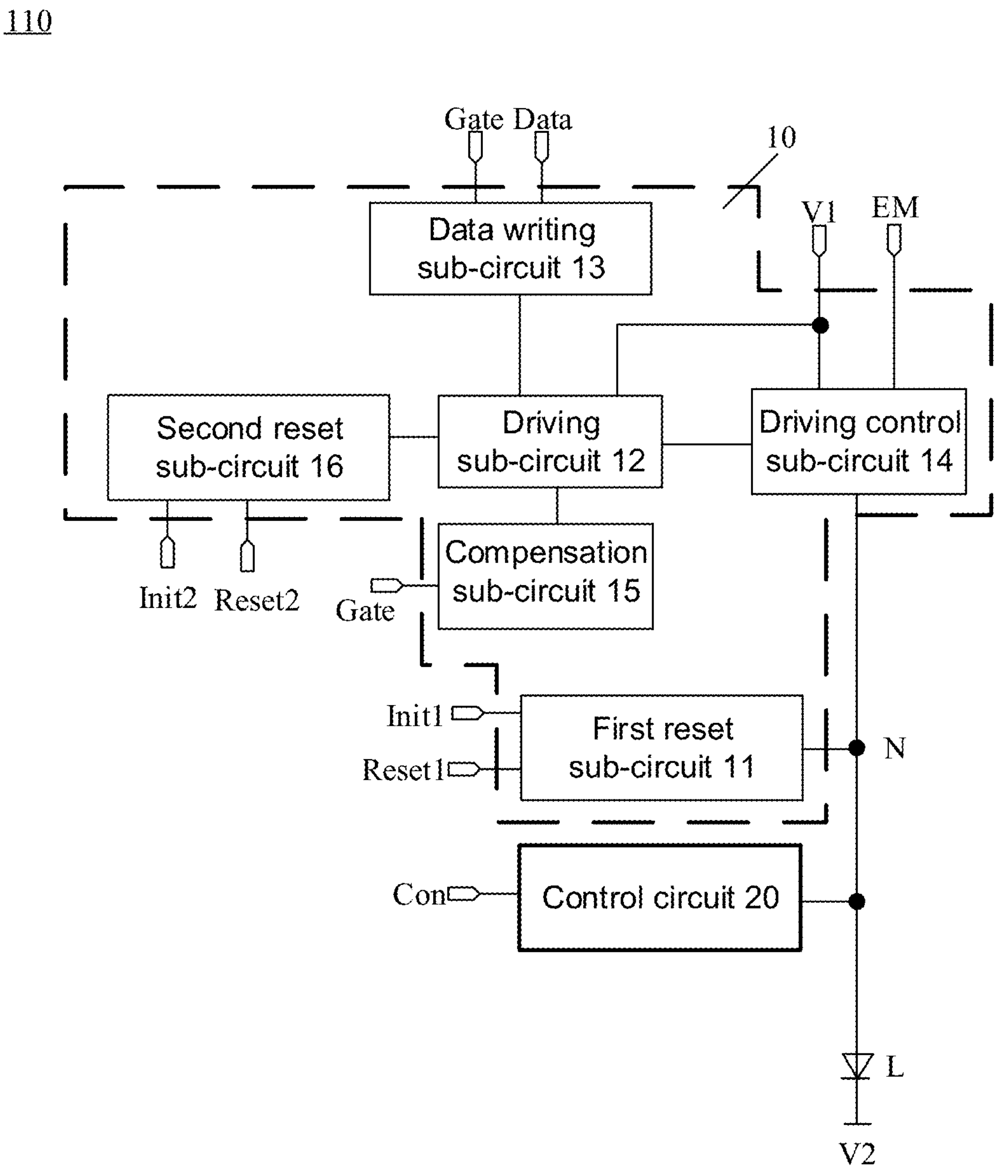
FIG. 5 is a schematic diagram showing a structure of another pixel circuit, in accordance with some embodiments.

In some embodiments, as shown in FIG. 5, the pixel circuit 10 includes a first reset sub-circuit 11. The first reset sub-circuit is coupled to the first reset signal terminal Reset1, the first initial signal terminal Init1 and the control node N. The first reset sub-circuit 11 is configured to transmit the first initial signal received at the first initial signal terminal Init1 to the control node N in response to the first reset signal received at the first reset signal terminal Reset1.

For example, as shown in FIG. 6A, the first reset sub-circuit 11 includes a second transistor T2. A control electrode of the second transistor T2 is coupled to the first reset signal terminal Reset1, a first electrode of the second transistor T2 is coupled to the first initial signal terminal Init1, and a second electrode of the second transistor T2 is coupled to the control node N. In this way, the second transistor T2 is turned on in response to the first reset signal received at the first reset signal terminal Reset1, and transmits the first initial signal received at the first initial signal terminal Init1 to the control node N, so that the voltage of the control node N reaches the voltage of the first initial signal. The first electrode of the element L to be driven is coupled to the control node N, so that the first electrode of the element L to be driven is coupled to the second electrode of the second transistor T2. In this way, the second transistor T2 may transmit the first initial signal to the element L to be driven to reset the element L to be driven, thereby avoiding signal interference.

In some embodiments, as shown in FIG. 5, the driving circuit 10 further includes a driving sub-circuit 12 and a data writing sub-circuit 13. The data writing sub-circuit 13 is coupled to the scan signal terminal Gate, the date signal terminal Data and the driving sub-circuit 12. As shown in FIG. 6A, the driving sub-circuit 12 includes a driving transistor DT and a capacitor Cst. A first terminal of the capacitor Cst is coupled to the first voltage terminal V1, and a second terminal of the capacitor Cst is coupled to a control electrode of the driving transistor DT. The data writing sub-circuit 13 is configured to write the data signal received at the data signal terminal Data into the driving sub-circuit 12 in response to the scan signal received at the scan signal terminal Gate. The driving sub-circuit 12 is configured to generate the driving signal according to the written data signal and the first voltage of the first voltage terminal V1.

It will be noted that, the capacitor in the embodiments of the present disclosure may be a capacitor device separately manufactured through a process. For example, the capacitor device is realized by manufacturing special capacitor electrodes, and each capacitor electrode of the capacitor may be realized by a metal layer, a semiconductor layer (e.g., doped with polysilicon), or the like. The capacitor may also be realized by a parasitic capacitance between transistors, or by a parasitic capacitance between a transistor and other device or wiring, or by a parasitic capacitance between wirings of a circuit.

For example, as shown in FIG. 6A, the data writing sub-circuit 13 includes a third transistor T3. A control electrode of the third transistor T3 is coupled to the scan signal terminal Gate, a first electrode of the third transistor T3 is coupled to the data signal terminal Data, and a second electrode of the third transistor T3 is coupled to a first electrode of the driving transistor DT.

In some embodiments, the first reset signal received at the first reset signal terminal Reset1 and the scan signal received at the scan signal terminal Gate are a same signal. That is, the first reset signal and the scan signal are the same. For example, the first reset signal terminal Reset1 and the scan signal terminal Gate are coupled to a same signal terminal. In this way, the circuit structure may be simplified.

In some embodiments, as shown in FIG. 5, the driving circuit 10 further includes a driving control sub-circuit 14. The driving control sub-circuit 14 is coupled to the enable signal terminal EM, the first voltage terminal V1, the driving sub-circuit 12 and the control node N. The driving control sub-circuit 14 is configured to cause the driving sub-circuit 12 to form a conductive path with the first voltage terminal V1 and the control node N in response to the enable signal received at the enable signal terminal EM. For example, though the driving control sub-circuit 14, the first electrode of the driving transistor DT in the driving sub-circuit 12 and the first voltage terminal V1 form a conductive path, and the second electrode of the driving transistor DT and the control node N form a conductive path. In this way, the driving sub-circuit 12 may generate the driving signal according to the first voltage of the first voltage terminal V1 and the written data signal, and transmit the driving signal to the control node N.

For example, as shown in FIG. 6A, the driving control sub-circuit 14 includes a fourth transistor T4 and a fifth transistor T5. A control electrode of the fourth transistor T4 is coupled to the enable signal terminal EM, a first electrode of the fourth transistor T4 is coupled to the first voltage terminal V1, and a second electrode of the fourth transistor T4 is coupled to the first electrode of the driving transistor DT. A control electrode of the fifth transistor T5 is coupled to the enable signal terminal EM, a first electrode of the fifth transistor T5 is coupled to the second electrode of the driving transistor DT, and a second electrode of the fifth transistor T5 is coupled to the control node N.

In this case, in a phase in which the sub-pixel does not emit light (e.g., a data signal writing phase), the fifth transistor T5 is in a turned-off state in response to the enable signal, and the driving transistor DT is disconnected from the control node N, so as to prevent the voltage of the control node N from signal interference, and ensure the accuracy of the voltage of the control node N.

In some embodiments, as shown in FIG. 5, the driving circuit 10 further includes a compensation sub-circuit 15. The compensation sub-circuit 15 is coupled to the scan signal terminal Gate and the driving sub-circuit 12. The compensation sub-circuit 15 is configured to write the data signal and a threshold voltage of the driving transistor DT in the driving sub-circuit 12 into the control electrode of the driving transistor DT in response to the scan signal received at the scan signal terminal Gate. In this way, the influence of the threshold voltage of the driving transistor DT on the driving signal may be avoided.

For example, as shown in FIG. 6A, the compensation sub-circuit 15 includes a sixth transistor T6. A control electrode of the sixth transistor T6 is coupled to the scan signal terminal Gate, a first electrode of the sixth transistor T6 is coupled to the second electrode of the driving transistor DT, and a second electrode of the sixth transistor T6 is coupled to the control electrode of the driving transistor DT. In this way, the sixth transistor T6 in the compensation sub-circuit 15 may write the data signal and the threshold voltage of the driving transistor DT into the control electrode of the driving transistor DT, so as to realize the threshold voltage compensation.

In some embodiments, as shown in FIG. 5, the driving circuit 10 further includes a second reset sub-circuit 16. The second reset sub-circuit 16 is coupled to a second reset signal terminal Reset2, a second initial signal terminal Init2 and the driving sub-circuit 12. The reset sub-circuit 16 is configured to transmit a second initial signal received at the second initial signal terminal Init2 to the driving sub-circuit 12 in response to a second reset signal received at the second reset signal terminal Reset2. In this way, the driving sub-circuit 12 may be reset to avoid signal interference.

For example, the voltage of the second initial signal may be selected according to actual situations, which is not limited herein. For example, the second initial signal may be a DC signal. For example, the second initial signal may be a high-level signal or a low-level signal. For example, the second initial signal and the first initial signal may be the same, or may be different.

For example, as shown in FIG. 6A, the second reset sub-circuit 16 includes a seventh transistor T7. A control electrode of the seventh transistor T7 is coupled to the second reset signal terminal Reset2, a first electrode of the seventh transistor T7 is coupled to the second initial signal terminal Init2, and a second electrode of the seventh transistor T7 is coupled to the driving sub-circuit 12. For example, in a case where the driving sub-circuit 12 includes the driving transistor DT and the capacitor Cst, the second electrode of the seventh transistor T7 in the second reset sub-circuit 16 is coupled to the control electrode of the driving transistor DT and the second terminal of the capacitor Cst in the driving sub-circuit 12. In this way, the seventh transistor T7 may transmit the second initial signal received at the second initial signal terminal to the control electrode of the driving transistor DT and the second terminal of the capacitor Cst, and the control electrode of the driving transistor DT and the second terminal of the capacitor Cst are reset, so as to avoid signal interference.

Figure 8:
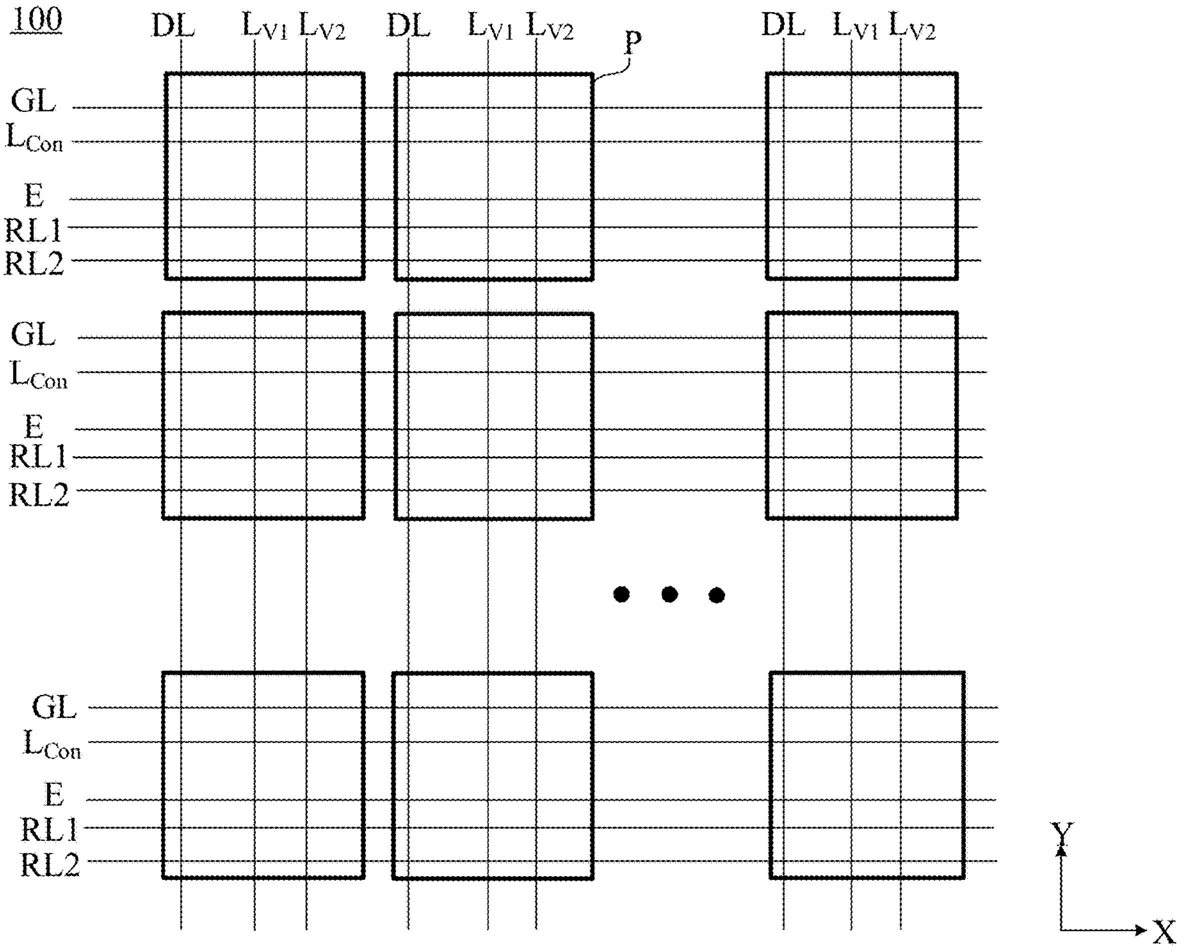
FIG. 8 is a schematic diagram showing a structure of a display panel, in accordance with some embodiments.

In some embodiments, referring to FIG. 8, the display panel 100 further includes a plurality of control signal lines $L_{Con}$. The control signal terminal Con of the pixel circuit 110 is coupled to a control signal line $L_{Con}$. The plurality of control signal lines $L_{Con}$ are configured to transmit a plurality of control signals. In some examples, the plurality of control signal lines $L_{Con}$ may extend along a row direction in which the sub-pixels P are arranged (e.g., along the first direction X). In some other examples, the plurality of control signal lines $L_{Con}$ may extend along a column direction in which the sub-pixels P are arranged (e.g., along the second direction Y). In yet other examples, the plurality of control signal lines $L_{Con}$ may be arranged in a grid. For example, some of the plurality of control signal lines $L_{Con}$ extend along the row direction in which the sub-pixels P are arranged (e.g., along the first direction X), and the others extend along the column direction in which the sub-pixels P are arranged (e.g., along the second direction Y).

In some embodiments, pixel circuits in sub-pixels of a same color are coupled to a same control signal line. For example, the pixel circuits in the sub-pixels of the same color receive a same control signal. For example, control signal terminals of pixel circuits in sub-pixels of the first color in the display panel are coupled to a same control signal line, and receive a same control signal; control signal terminals of pixel circuits in sub-pixels of the second color in the display panel are coupled to a same control signal line, and receive a same control signal; control signal terminals of pixel circuits in sub-pixels of the third color in the display panel are coupled to a same control signal line, and receive a same control signal. In this way, control signals received by pixel circuits in sub-pixels of different colors may be adjusted, so as to adjust turned-on durations of elements to be driven in combination with the driving signal. Therefore, it may be possible to shorten the turned-on durations of the elements to be driven, avoid color shift of sub-pixels with low gray scales, and avoid the difference in turned-on durations of the elements to be driven in the sub-pixels of the same color. As a result, the turned-on durations of the elements to be driven in the sub-pixels of the same color are approximately the same.

In some embodiments, as shown in FIG. 8, the display panel 100 further includes a plurality of scan signal lines GL and a plurality of data signal lines DL. For example, the scan signal lines GL extend along the row direction in which the sub-pixels P are arranged (e.g., along the first direction X), and the data signal lines DL extend along the column direction in which the sub-pixels P are arranged (e.g., along the second direction Y). A scan signal line is coupled to the scan signal terminal of the pixel circuit, and a data signal line is coupled to the data signal terminal of the pixel circuit. The scan signal lines are configured to transmit scan signals, and the data signal lines are configured to transmit data signals.

In some embodiments, as shown in FIG. 8, the display panel 100 further includes a plurality of enable signal lines E. An enable signal line is coupled to the enable signal terminal of the pixel circuit. The enable signal lines are configured to transmit enable signals. For example, referring to FIG. 8, the enable signal lines E extend along the same direction as the scan signal lines GL. That is, the enable signal lines E extend along the first direction X.

In some embodiments, as shown in FIG. 8, the display panel 100 further includes a plurality of first reset signal lines RL1. For example, the first reset signal lines RL1 and the scan signal lines GL extend along the same direction, and they both extend along the first direction X. A first reset signal line is coupled to the first reset signal terminal. The first reset signal lines are configured to transmit first reset signals.

For example, in a case where the first reset signal terminal and the scan signal terminal are coupled to the same signal terminal, a signal transmitted by the first reset signal line in the display panel is the same as a signal transmitted by the scan signal line. For example, the first reset signal line is the same as the scan signal line are coupled to a same signal line; or, the first reset signal line is coupled to the scan signal line.

For example, the display panel further includes a plurality of first initial signal lines. A first initial signal line is coupled to the first initial signal terminal. The first initial signal lines are configured to transmit first initial signals. The first initial signal lines may extend along the same direction as the scan signal lines. For example, referring to FIG. 8, the scan signal lines GL extend along the first direction X. Alternatively, the first initial signal lines may extend along the same direction as the data signal lines. For example, referring to FIG. 8, the data signal lines DL extend along the second direction Y. Alternatively, the first initial signal lines may be arranged in a grid. For example, some of the plurality of first initial signal lines extend in a same direction as the scan signal lines, and the others extend in a same direction as the data signal lines.

In some embodiments, as shown in FIG. 8, the display panel 100 further includes a plurality of second reset signal lines RL2. A second reset signal line is coupled to the second reset signal terminal. The second reset signal lines are configured to transmit second reset signals. The second reset signal lines may extend along the same direction as the scan signal lines. For example, referring to FIG. 8, the second reset signal lines RL2 and the scan signal lines GL may extend along the same direction, and they both extend along the first direction X.

For example, a second reset signal received by pixel circuits in sub-pixels in a row and a scan signal received by pixel circuits in sub-pixels in a previous are a same signal. A second reset signal line coupled to the pixel circuits in the sub-pixels in the row and a scan signal line coupled to the pixel circuits in the sub-pixels in the previous row may be coupled to a same signal line.

For example, the display panel further includes a plurality of second initial signal lines. A second initial signal line is coupled to the second initial signal terminal. The second initial signal lines are configured to transmit second initial signals. The second initial signal lines may extend along a same direction as the scan signal lines. (For example, referring to FIG. 8, the scan signal lines GL extend along the first direction X. Alternatively, the second initial signal lines may extend along a same direction as the data signal lines. For example, referring to FIG. 8, the data signal lines DL extend along the second direction Y. Alternatively, the second initial signal lines may be arranged in a grid. For example, some of the plurality of second initial signal lines extend in a same direction as the scan signal lines, and the others extend in a same direction as the data signal lines.

Figure 6B:
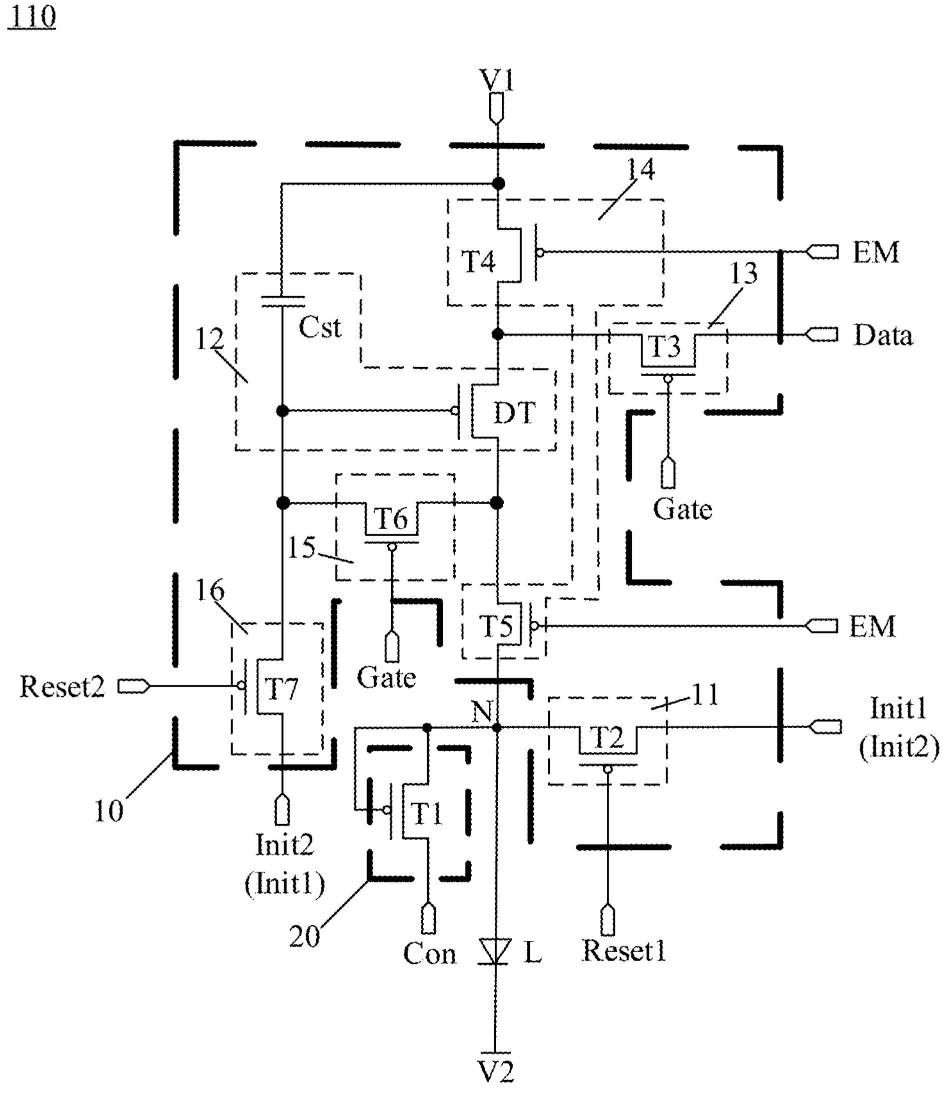
FIG. 6B is a circuit diagram of another pixel circuit, in accordance with some embodiments.

In some embodiments, the first initial signal terminal and the second initial signal terminal are coupled to a same signal terminal, and the first initial signal and the second initial signal are the same. For example, referring to FIG. 6B, the first reset sub-circuit 11 may be coupled to the second initial signal terminal Init2, and the first electrode of the second transistor T2 in the first reset sub-circuit 11 may be coupled to the second initial signal terminal Init2; the second reset sub-circuit 16 may be coupled to the first initial signal terminal Init1, and the first electrode of the seventh transistor T7 in the second reset sub-circuit 16 may be coupled to the first initial signal terminal Init1. For example, the first initial signal line coupled to the first initial signal terminal and the second initial signal line coupled to the second initial signal terminal may be coupled to the same signal line. In this way, it is possible to reduce the number of signals for driving the display panel and simplify the wiring of the display panel.

In addition, as shown in FIG. 8, the display panel 100 further includes a plurality of first voltage lines $L_{V1}$ and a plurality of second voltage lines $L_{V2}$. A first voltage line is coupled to the first voltage terminal, and a second voltage line is coupled to the second voltage terminal. The first voltage lines are each configured to transmit the first voltage, and the second voltage lines are each configured to transmit the second voltage. The wiring of the first voltage lines $L_{V1}$ and the second voltage lines $L_{V2}$ may be set by a person skilled in the art according to the spatial structure of the display panel, which is not limited herein. For example, referring to FIG. 8, the first voltage lines $L_{V1}$ and the second voltage lines $L_{V2}$ may extend in a same direction as the data signal lines DL, for example, extend in the second direction Y as shown in FIG. 8.

It will be noted that, the transistors used in the pixel circuit provided in the embodiments of the present disclosure may be thin film transistors (TFTs), field effect transistors (FETs), or other switching devices with same characteristics, which are not limited in the embodiments of the present disclosure.

In some embodiments, a control electrode of each transistor used in a pixel circuit is a gate of the transistor, a first electrode of the transistor is one of a source and a drain of the transistor, and a second electrode of the transistor is the other of the source and the drain of the transistor. Since the source and the drain of the transistor may be symmetrical in structure, there may be no difference in structure between the source and the drain of the transistor. That is, there may be no difference in structure between the first electrode and the second electrode of the transistor in the embodiments of the present disclosure. For example, in a case where the transistor is a P-type transistor, the first electrode of the transistor is the source, and the second electrode of the transistor is the drain. For example, in a case where the transistor is an N-type transistor, the first electrode of the transistor is the drain, and the second electrode of the transistor is the source. For example, the transistors used in the pixel circuit are all P-type transistors. For example, referring to FIGS. 6A and 6B, the first transistor T1, the second transistor T2, the third transistor T3, the fourth transistor T4, the fifth transistor T5, the sixth transistor T6, the driving transistor DT and the seventh transistor T7 are all P-type transistors.

In the pixel circuit provided in the embodiments of the present disclosure, specific implementations of the circuits (such as the driving circuit and the control circuit) and the sub-circuits (such as the driving sub-circuit, the data wiring sub-circuit, the driving control sub-circuit, the compensation sub-circuit, the first reset sub-circuit and the second reset sub-circuit) are not limited to the manners described above, and may be other implementation manners that are used, e.g., a conventional connection manner well known to a person skilled in the art, as long as implementation of corresponding functions is ensured. The above examples cannot limit the protection scope of the present disclosure. In practical applications, a person skilled in the art may choose to use or not to use one or more of the above circuits and the sub-circuits according to situations. Various combinations and changes based on the above circuits and the sub-circuits do not depart from the principle of the present disclosure, which will not repeated here.

It will be noted that, an image frame period includes a scan phase and an operation phase. For example, the scan phase may include a scan period of each row of sub-pixels. For example, all rows of sub-pixels in the display panel may sequentially enter the scan phase row by row. For example, a first row of sub-pixels to a last row of sub-pixels enter the scan phase row by row, and after the scan period of the last row of sub-pixels ends, the first row of sub-pixels to the last row of sub-pixels enter the operation phase row by row. An active duration of the first enable signal corresponding to each sub-pixel in the operation phase is the same. Alternatively, after all rows of sub-pixels in the display panel enter the operation phase simultaneously after entering the scan phase row by row. Alternatively, for example, each pixel circuit may also directly enter the operation phase after the scan period of each row of sub-pixels ends. For example, the first row of sub-pixels enters the operation phase after the scan period of the first row of sub-pixels ends, a second row of sub-pixels enters the scan phase after the scan period of the first row of sub-pixels ends, and the second row of sub-pixels enters the operation phase after the scan period of the second row of sub-pixels ends, and so on, until the last row of sub-pixels enters the operation phase after the scan period of the last row of sub-pixels ends.

It will be noted that, in the scan phase of each row, different or same data signals are written into the pixel circuits in a row of sub-pixels are simultaneously. That is, the data signals are a group of signals. The data signals written into the pixel circuits are related to gray scales that the corresponding sub-pixels need to display.

The operation process of the pixel circuit in different phases of one image frame will be described below by taking an example where the transistors in the pixel circuit are all P-type transistors. For example, a first phase and a second phase of the pixel circuit in one image frame belong to a scan period of a row of sub-pixels where the pixel circuit is located, and a third phase of the pixel circuit in one image frame belongs to the operation phase.

Figure 7:
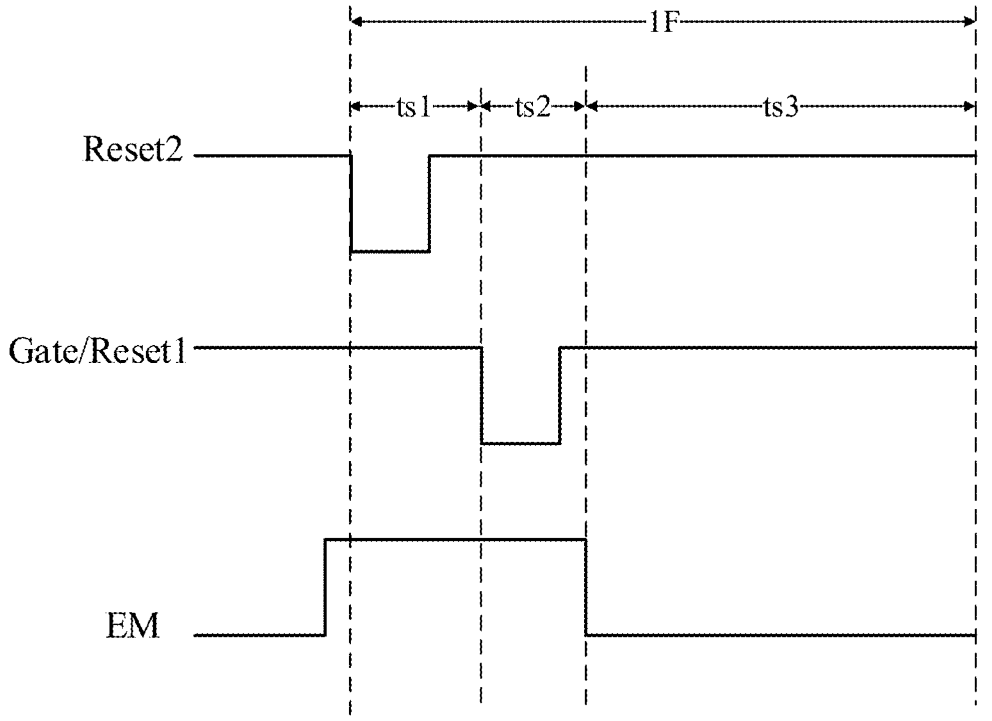
FIG. 7 is a timing diagram of a pixel circuit, in accordance with some embodiments.

In the first phase ts1 in one image frame 1F as shown in FIG. 7, referring to FIG. 5, the second reset sub-circuit 16 in the driving circuit 10 transmits the second initial signal received at the second initial signal terminal Init2 to the driving sub-circuit 12 in response to the second reset signal received at the second reset signal terminal Reset2.

For example, referring to FIG. 6A, in response to a low-level second reset signal received at the second reset signal terminal Reset2, the seventh transistor T7 in the second reset sub-circuit 16 is turned on and transmits the second initial signal received at the second initial signal terminal Init2 to the control electrode of the driving transistor DT in the driving sub-circuit 12. Thus, the driving transistor DT is reset. For example, a voltage of the control electrode of the driving transistor DT is the voltage of the second initial signal. In this way, the second initial signal received at the second initial signal terminal Init2 can eliminate influence of a signal in a previous frame on the voltage of the control electrode of the driving transistor DT. For example, the second initial signal may be a low-level signal or a high-level signal. For example, in a case where the driving transistor is a P-type transistor, the voltage of the second initial signal is greater than zero.

Therefore, in the first phase, the element to be driven is not turned on, and the element to be driven does not operate.

In the second phase ts2 in one image frame 1F as shown in FIG. 7, referring to FIG. 5, the data writing sub-circuit 13 in the driving circuit 10 writes the data signal received at the data signal terminal Data into the driving sub-circuit 12 in response to the scan signal received at the scan signal terminal Gate. For example, referring to FIG. 6A, in response to a low-level scan signal received at the scan signal terminal Gate, the third transistor T3 in the data writing sub-circuit 13 is turned on and writes the data signal received at the data signal terminal Data into the driving sub-circuit 12, for example, into the first electrode of the driving transistor DT.

The compensation sub-circuit 15 writes the data signal and the threshold voltage of the driving transistor DT in the driving sub-circuit 12 into the control electrode of the to driving transistor DT in response to the scan signal received at the scan signal terminal Gate. For example, the sixth transistor T6 in the compensation sub-circuit 15 is turned on in response to the low-level scan signal received at the scan signal terminal Gate, so as to connect the control electrode of the driving transistor DT to the second electrode of the driving transistor DT. Thus, the driving transistor DT is in a self-saturation state (or a diode-conducting state). The voltage of the control electrode of the driving transistor DT is a sum of the voltage of the first electrode of the driving transistor DT and the threshold voltage of the driving transistor DT. That is, the data signal and the threshold voltage of the driving transistor DT are written into the control electrode of the driving transistor DT. In this case, the voltage Vg of the control electrode of the driving transistor DT is equal to ($V_{data}$+$V_{th}$) (i.e., Vg=$V_{data}$+$V_{th}$), $V_{data}$ is the voltage of the data signal, and $V_{th}$ is the threshold voltage of the driving transistor DT.

In this case, a voltage of the second terminal of the capacitor Cst coupled to the control electrode of the driving transistor DT is also ($V_{data}$+$V_{th}$). The first terminal of the capacitor Cst is coupled to the first voltage terminal V1. Thus, a voltage of the first terminal of the capacitor Cst is the first voltage $V_{DD}$. In this case, the two terminals of the capacitor Cst are charged, and a potential difference between the two terminals of the capacitor Cst is ($V_{DD}$−$V_{data}$−$V_{th}$).

The first reset sub-circuit 11 transmits the first initial signal received at the first initial signal terminal Init1 to the control node N in response to the first reset signal received at the first reset signal terminal Reset1. For example, referring to FIG. 6A, in response to a low-level first reset signal received at the first reset signal terminal Reset1, the second transistor T2 in the first reset sub-circuit 11 is turned on and transmits the first initial signal received at the first initial signal terminal Init1 to the control node N, so as to charge the control node N. The control node N is coupled to the first electrode of the element L to be driven, and the first reset sub-circuit 11 may transmit the first initial signal to the first electrode of the element L to be driven, so that the voltage of the first electrode of the element L to be driven is the voltage of the first initial signal to reset the element L to be driven, which may eliminate influence of a signal in the previous frame on the element to be driven and avoid signal interference.

The control circuit 20 transmits the control signal received at the control signal terminal Con to the control node N in response to the voltage of the control node N. For example, referring to FIG. 6A, in response to the voltage of the control node N, the first transistor T1 in the control circuit 20 is turned on and transmits the control signal received at the control signal terminal Con to the control node N. In a case where the absolute value of the voltage difference between the control electrode and the first electrode of the first transistor T1 is greater than or equal to the absolute value of the threshold voltage of the first transistor T1, the first transistor T1 is turned on. For example, the first reset sub-circuit 11 transmits an initial signal (e.g., the first initial signal or the second initial signal) to the control node N, so that the voltage of the control node N is changed. The voltage of the control electrode of the first transistor T1 in the control circuit 20 is changed correspondingly with the voltage of the control node N. The voltage of the first electrode of the first transistor T1 is the voltage of the control signal. Therefore, in a case where the absolute value of the difference between the voltage of the control electrode of the first transistor and the voltage of the first electrode of the first transistor is greater than or equal to the absolute value of the threshold voltage of the first transistor, that is, in a case where an absolute value of a difference between the voltage of the control node and the voltage of the control signal is greater than or equal to the absolute value of the threshold voltage of the first transistor, the first transistor is turned on, and the first transistor transmits the control signal to the control node, which causes the voltage of the control node to be changed.

The difference between the voltage of the control node (i.e., the voltage of the first initial signal) and the voltage of the control signal, and the threshold voltage of the first transistor have a small difference. That is, a difference between the gate-source voltage difference and the threshold voltage of the first transistor is small. In this case, the first transistor is turned on but not in a full turned-on state, and the first transistor may slowly charge the control node according to the control signal. For example, the first transistor obtains an auxiliary charging current according to the control signal, and a magnitude of the auxiliary charging current is approximately in a picoampere level. The auxiliary charging current is transmitted to the control node, so that the voltage of the control node is gradually increased. Therefore, the charging time of the control node by the control signal is relatively long.

Therefore, in the second phase, the element to be driven is not turned on, and the element to be driven does not operate.

In the third phase ts3 in one image frame 1F as shown in FIG. 7, referring to FIG. 5, in response to the enable signal received at the enable signal terminal EM, the driving control sub-circuit 14 in the driving circuit 10 causes the driving sub-circuit 12 to form a conductive path with the first voltage terminal V1 and the control node N. That is, the driving transistor DT in the driving sub-circuit 12, the first voltage terminal V1 and the second control circuit 20 form a conductive path. For example, referring to FIG. 6A, the fourth transistor T4 in the driving control sub-circuit 14 is turned on in response to a low-level enable signal received at the enable signal terminal EM, and the first electrode of the driving transistor DT is coupled to the first voltage terminal V1 through the fourth transistor T4. The fifth transistor T5 in the driving control sub-circuit 14 is turned on in response to the low-level enable signal received at the enable signal terminal EM, and the second electrode of the driving transistor DT is coupled to the control node N. Therefore, the driving transistor DT in the driving sub-circuit 12, the first voltage terminal V1 and the control node N form a conductive path.

In this case, the driving sub-circuit 12 generates the driving signal according to the written data signal and the first voltage of the first voltage terminal V1. For example, according to the law of conservation of charge of the capacitor, a potential difference between the first terminal and the second terminal of the capacitor Cst in the driving sub-circuit 12 remains unchanged. In a case where the voltage of the first terminal of the capacitor Cst is maintained at the first voltage, the voltage of the second terminal of the capacitor Cst is still ($V_{data}$+$V_{th}$), and the voltage of the control electrode of the driving transistor DT is ($V_{data}$+$V_{th}$).

It will be understood that, in a case where the absolute value of the gate-source voltage difference (i.e., the voltage difference between the control electrode and the first electrode) of the driving transistor DT is greater than or equal to the absolute value of the threshold voltage $V_{th}$ of the driving transistor DT, the driving transistor DT is turned on and then generates the driving signal, and the driving signal is output from the second electrode of the driving transistor DT. Since the voltage of the control electrode of the driving transistor DT is ($V_{data}$+$V_{th}$), the voltage of the first electrode of the driving transistor DT is the first voltage $V_{DD}$. In this case, the gate-source voltage difference $V_gs$ of the driving transistor is the difference between $(V_{data}+V_{th})$ and $V_{DD}$ $(V_{gs}=V_{data}+V_{th}-V_{DD})$. Therefore, the driving current I passing through the driving transistor DT is that $I=\frac{1}{2}\cdot K\cdot(V_{gs}-V_{th})^2=\frac{1}{2}\cdot K\cdot(V_{data}+V_{th}-V_{DD}-V_{th})^2=\frac{1}{2}\cdot K\cdot(V_{data}-V_{DD})^2$, and the driving current I is used as the driving signal generated by the driving sub-circuit 21. Here, $K=W/L\cdot C\cdot u$, W/L is a width-to-length ratio of the driving transistor DT, C is a capacitance of a channel insulating layer, and u is a channel carrier mobility.

In this way, the driving signal generated by the driving circuit 10 is only related to the data signal and the first voltage, and is unrelated to the threshold voltage of the driving transistor DT, so that compensation for the threshold voltage of the driving transistor in the driving circuit is realized. As a result, an influence of the threshold voltage of the driving transistor DT on the operation (e.g., the brightness) of the element L to be driven is avoid, and the uniformity of the brightness of the element L to be driven is improved.

It will be understood that, in a case where the sub-pixels corresponding to the pixel circuits display different gray scales, the first voltage of the first voltage terminal is a DC voltage signal, and the magnitude of the driving signal may be changed by controlling the voltage of the data signal, so that a sub-pixel displays a corresponding gray scale.

In this case, in a process of transmitting the driving signal to the control node, the driving signal charges the control node, so that the voltage of the control node is gradually increased. That is, the voltage of the first electrode of the element to be driven is gradually increased. In a case where a voltage difference between the first electrode and the second electrode of the element to be driven satisfies the turned-on voltage of the element to be driven, the element to be driven is turned on. Since the voltage of the control node is approximately the voltage of the control signal, and is higher than the voltage of the first initial signal, the voltage of the control node may quickly reach a voltage value of the first electrode of the element to be driven when the element to be driven is turned on. Therefore, the rising time of the voltage of the control node is shortened, the rising rate of the voltage of the control node is improved, and the rising time of the voltage of the first electrode of the element to be driven is shortened. As a result, the voltage difference between the first electrode and the second electrode of the element to be driven may quickly reach the turned-on voltage of the element to be driven, and the element to be driven may be turned on quickly, which reduces the turned-on duration of the element to be driven. The duration between the start moment at which the enable signal is at the active level and the moment at which the element to be driven is turned on is the turned-on duration of the element to be driven. The enable signal at the active level is referred to that transistor(s) (e.g., the fourth transistor and the fifth transistor) in the pixel circuit receive the enable signal at the active level are turned on. For example, for a P-type transistor, the active level of the enable signal is a low-level portion of the enable signal received at the enable signal terminal EM in FIG. 7.

Therefore, in the third phase, the element to be driven operates. For example, the element to be driven emits light.

It will be noted that, a magnitude of the driving current (i.e., the driving signal) is related to the properties of the driving transistor. For pixel circuits that provides driving signals to sub-pixels of different colors (e.g., red sub-pixels, green sub-pixels and blue sub-pixels), there is a need to take photoelectric properties of light-emitting elements that realize sub-pixels of different colors into consideration, and different driving capabilities may be achieved by designing size of driving transistors. For example, for a driving transistor of a pixel circuit that provides a driving signal to the red sub-pixel, a driving transistor of a pixel circuit that provides a driving signal to the green sub-pixel, and a driving transistor of a pixel circuit that provides a driving signal to the blue sub-pixel, width-to-length ratios of at least two driving transistors are different. Therefore, in a case where sub-pixels of different colors all display the same gray scale, theoretically, if sizes of driving transistors in the pixel circuits that provide driving signals to the sub-pixels of different colors are exactly the same, magnitudes of the driving signals required by different sub-pixels may be different; if amplitudes of data signals provided to pixel circuits in different sub-pixels are different, the design complexity may be greatly increased. By designing the size of the driving transistor in each pixel circuit, e.g., changing the width-to-length ratio of the driving transistor to adjust the magnitude of the driving signal, data signals with the same amplitude may be provided to different sub-pixels.

In a case where the sub-pixel corresponding to the pixel circuit displays a high gray scale, the driving signal is relatively large (that is, the driving current is relatively large), so that the driving signal has great effect on increasing the voltage of the control node, and the voltage of the control node may rise quickly due to the driving signal. In this way, the first transistor in the control circuit may be in a turned-off state earlier, and the control signal has little effect on increasing the voltage of the control node. Thus, the charging time of the control node by the control signal is short. However, in a case where the sub-pixel corresponding to the pixel circuit displays a low gray scale, since the driving signal is relatively small (that is, the driving current is relatively small), the driving signal has little effect on increasing the voltage of the control node, and the voltage of the control node may rise slowly due to the driving signal. In this way, the first transistor in the control circuit may be in a turned-off state later, and the control signal has great effect on increasing the voltage of the control node. Thus, the charging time of the control node by the control signal is long. In this way, for the sub-pixel that displays the lower gray scale, the control signal has a greater effect on adjusting the turned-on duration of the element to be driven, so that the turned-on duration of the element to be driven is shortened. As a result, the color shift of the sub-pixel that displays a low gray scale is ameliorated, and the display effect is improved.

In addition, a coupling capacitance exists at the control node, the coupling capacitance includes parasitic capacitance of the element to be driven, and further includes capacitances created by conductive structures in the display panel whose orthographic projections on the substrate overlap with each other, such as capacitance created by signal lines that cross with each other. Therefore, the rising rate of the voltage of the control node is affected by the capacitance at the control node. For example, for sub-pixels of different colors, such as the sub-pixel of the first color, the sub-pixel of the second color, and the sub-pixel of the third color, turned-on voltages of corresponding elements to be driven are different, so that turned-on durations of the elements to be driven in the sub-pixels of different colors are different. If the turned-on duration of the element to be driven is long, a brightness ratio of the sub-pixels of different colors is prone to deviate from the theoretical value, resulting in the color shift of the display. In this case, in the embodiments of the present disclosure, the turned-on durations of the elements to be driven in the sub-pixels of different colors may be shortened, so that the element to be driven in each sub-pixel may be turned on in a short time, correspondingly, the difference in the turned-on durations of the elements to be driven in the sub-pixels of different colors is reduced, thereby avoiding a large deviation in the brightness ratio of the sub-pixels of different colors, and avoiding color shift of the display.

Figure 9:
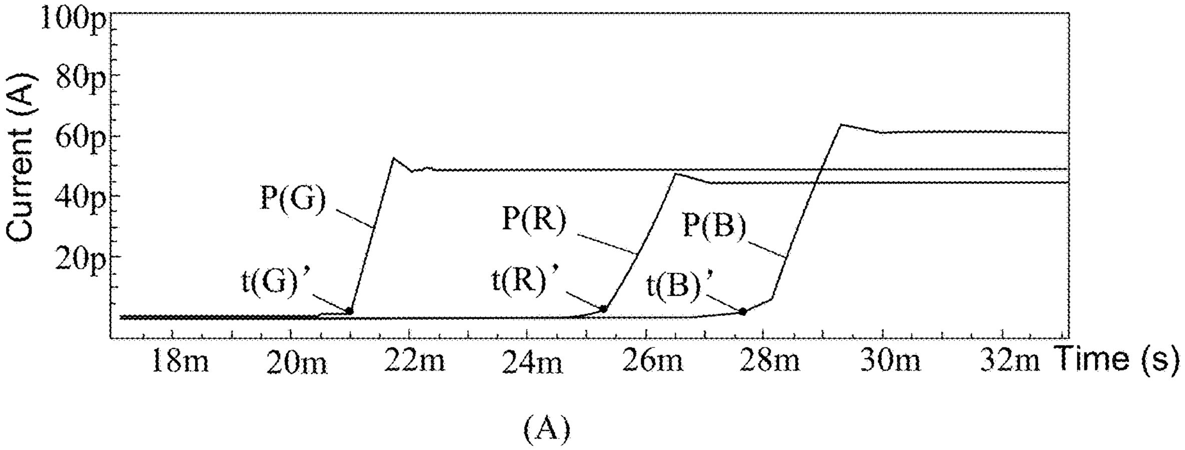
FIG. 9 is a diagram showing waveforms of currents passing through elements to be driven in different sub-pixels, in accordance with some embodiments.
Figure 9:
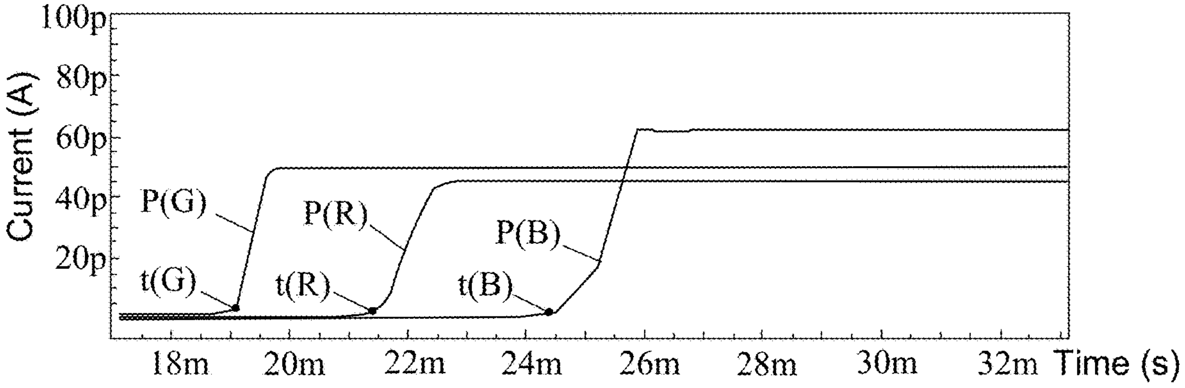

For example, sub-pixels display a same gray scale, and control signals and first initial signals received by the pixel circuits of the plurality of sub-pixels are the same (for example, voltages of the control signals are −1.3 V, and voltages of the first initial signals are −3 V). In this case, part (A) in FIG. 9 illustrates that, in a case where the voltage of the control node is the voltage of the first initial signal and before the driving signal is transmitted to control node, turned-on durations of the elements to be driven in a sub-pixel P(R) of the first color, a sub-pixel P(G) of a second color and the sub-pixel P(B) of the third color are respectively t(R)', t(G)' and t(B)'; part (B) in FIG. 9 illustrates that, in a case where the control circuit transmits the control signal to the control node before the driving signal is transmitted to the control node, the turned-on durations of the elements to be driven in the sub-pixel P(R) of the first color, the sub-pixel P(G) of the second color and the sub-pixel P(B) of the third color are respectively t(R), t(G) and t(B). It will be noted that, the turned-on duration t(R)' of the element to be driven in the sub-pixel P(R) of the first color in part (A) in FIG. 9 is delayed compared to the turned-on duration t(R) of the element to be driven in the sub-pixel P(R) of the first color in part (B) in FIG. 9, the turned-on duration t(G)' of the element to be driven in the sub-pixel P(G) of the second color in part (A) in FIG. 9 is delayed compared to the turned-on duration t(G) of the element to be driven in the sub-pixel P(G) of the second color in part (B) in FIG. 9, the turned-on duration t(B)' of the element to be driven in the sub-pixel P(B) of the third color in part (A) in FIG. 9 is delayed compared to the turned-on duration t(B) of the element to be driven in the sub-pixel P(B) of the third color in part (B) in FIG. 9. In this way, the turned-on durations of the elements to be driven of the sub-pixel P(R) of the first color, the sub-pixel P(G) of the second color and the sub-pixel P(B) of the third color are all shortened. It can be understood that, since the voltage of the control signal is greater than the voltage of the first initial signal, the voltage of the control node is greater than the voltage of the first initial signal. Therefore, when the driving signal is transmitted to the control node, the rising rate of the voltage of the control node may be increased, which may cause the element to be driven to be turned on faster, and cause the turned-on duration of the element to be driven to be shortened. In this case, the turned-on durations of the elements to be driven in the sub-pixels may be adjusted by adjusting the voltages of the control signals. For example, control signal lines transmit the control signals may be transmitted to pixel circuits in the sub-pixels, so that pixel circuits in one or more sub-pixels receive the same control signals. A turned-on duration of an element to be driven in one sub-pixel may be individually adjusted, or turned-on durations of elements to be driven in more sub-pixels may be adjusted, thereby ameliorating the color shift when low gray scales are displayed.

Figure 10:
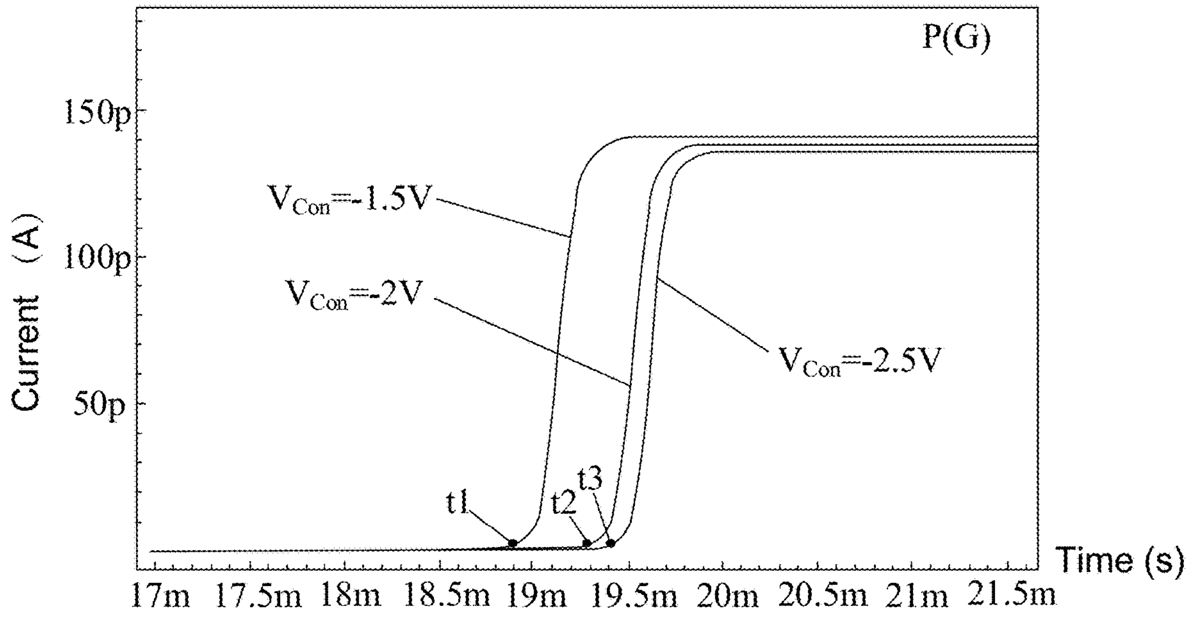
FIG. 10 is a diagram showing waveforms of currents passing through an element to be driven in a same sub-pixel, in accordance with some other embodiments.

For example, in a case where a fixed gray scale is displayed, if the control signals received by the pixel circuits in the sub-pixels of the same color are different, the turned-on durations of the elements to be driven in the sub-pixels of the same color may be different. For example, the greater the voltage of the control signal received by the pixel circuit, the shorter the turned-on duration of the element to be driven. That is, the greater the voltage of the control signal received by the pixel circuit, the earlier the element to be driven is turned on. For example, as shown in FIG. 10, for a sub-pixel of a single color (e.g., a sub-pixel of the second color or a green sub-pixel) displays the same gray scale, if voltages $V_{con}$ of control signals received by the pixel circuit are respectively −2.5 V, −2 V and −1.5 V, a corresponding turned-on duration t3 of the element to be driven when the voltage $V_{con}$ of the control signal received by the pixel circuit is −2.5 V is delayed compared to a corresponding turned-on duration t2 of the element to be driven when the voltage $V_{con}$ of the control signal received by the pixel circuit is −2 V; a corresponding turned-on duration t2 of the element to be driven when the voltage $V_{con}$ of the control signal received by the pixel circuit is −2 V is delayed compared to a corresponding turned-on duration t1 of the element to be driven when the voltage $V_{con}$ of the control signal received by the pixel circuit is −1.5 V. In this way, the turned-on duration of the element to be driven may be adjusted by adjusting the magnitude of the voltage of the control signal.

In some embodiments, as shown in FIG. 1, the display device 200 further includes a driver chip 210. The driver chip 210 is coupled to the display panel 100. The driver chip 210 is configured to provide signals for the display panel 100. For example, the driver chip may be a driver integrated circuit (IC). For example, a single driver chip 210 may provide data signals for the display panel 100, and the driver chip 210 may further provide control signals for the display panel 100. Alternatively, the display device 200 includes a plurality of driver chips, and a part of the plurality of driver chips provide data signals for the display panel, and another part of the plurality of driver chips provide control signals for the display panel.

For example, the driver chip may include a plurality of control signal transmission pins, and the control signal transmission pins are used for outputting control signals. For example, the plurality of control signal lines in the display panel are coupled to the plurality of control signal transmission pins of the driver chip, respectively. For example, control signal lines coupled to the pixel circuits in the sub-pixels of different colors may be coupled to different control signal transmission pins of the driver chip, thereby transmitting different control signals.

Some embodiments of the present disclosure provide a driving method of a pixel circuit. The pixel circuit may be the pixel circuit as described in any one of the above embodiments. The pixel circuit includes a driving circuit and a control circuit. The driving circuit is coupled to at least a first reset signal terminal, a first initial signal terminal, a scan signal terminal, a data signal terminal, a first voltage terminal, an enable signal terminal and a control node. The control circuit is coupled to the control signal terminal and the control node.

The driving method of the pixel circuit includes: transmitting, by the driving circuit, a first initial signal received at the first initial signal terminal to the control node in response to a first reset signal received at the first reset signal terminal; writing, by the driving circuit, a data signal received at the data signal terminal in response to a scan signal received at the scan signal terminal; generating, by the driving circuit, a driving signal according to a first voltage of the first voltage terminal and the written data signal in response to an enable signal received at the enable signal terminal, and outputting, by the driving circuit, the driving signal to an element to be driven coupled to the control node;

and transmitting, by the control circuit, a control signal received at the control signal terminal to the control node in response to a voltage of the control node, so as to control a turned-on duration of the element to be driven in conjunction with the driving signal.

In some embodiments, a voltage of the control signal is greater than a voltage of the first initial signal.

It will be noted that, as for the driving method of the pixel circuit, reference can be made to the above description of the operation process of the pixel circuit, and the driving method of the pixel circuit has the same beneficial effects as the pixel circuit, and the details will not be repeated here.

The foregoing descriptions are merely specific implementations of the present disclosure, but the protection scope of the present disclosure is not limited thereto.

Changes or replacements that any person skilled in the art could conceive of within the technical scope of the present disclosure, which shall be included in the protection scope of the present disclosure. Therefore, the protection scope of the present disclosure shall be subject to the protection scope of the claims.

What is claimed is:

1. A pixel circuit, comprising:

a driving circuit coupled to at least a first reset signal terminal, a first initial signal terminal, a scan signal terminal, a data signal terminal, a first voltage terminal, an enable signal terminal and a control node, wherein the driving circuit is configured to: transmit a first initial signal received at the first initial signal terminal to the control node in response to a first reset signal received at the first reset signal terminal; write a data signal received at the data signal terminal in response to a scan signal received at the scan signal terminal; generate a driving signal according to a first voltage of the first voltage terminal and the written data signal in response to an enable signal received at the enable signal terminal; and output the driving signal to a first electrode of an element to be driven that is coupled to the control node; and a control circuit coupled to a control signal terminal and the control node, wherein the control circuit is configured to transmit a control signal received at the control signal terminal to the control node in response to a voltage of the control node, so as to control a turned-on duration of the element to be driven in conjunction with the driving signal, wherein wherein the control circuit includes a first transistor, a control electrode of the first transistor is coupled to the control node, a second electrode of the first transistor is coupled to the control node, and a first electrode of the first transistor is coupled to the control signal terminal, wherein the first transistor is a P-type transistor; and a voltage of the control signal is a low-level signal, a voltage of the first initial signal is a low-level signal, and the voltage of the control signal is greater than the voltage of the first initial signal.

2. The pixel circuit according to claim 1, wherein the driving circuit includes a first reset sub-circuit coupled to the first reset signal terminal, the first initial signal terminal and the control node; and the first reset sub-circuit is configured to transmit the first initial signal received at the first initial signal terminal to the control node in response to the first reset signal received at the first reset signal terminal.

3. The pixel circuit according to claim 2, wherein the first reset sub-circuit includes a second transistor, a control electrode of the second transistor is coupled to the first reset signal terminal, a first electrode of the second transistor is coupled to the first initial signal terminal, and a second electrode of the second transistor is coupled to the control node.

4. The pixel circuit according to claim 1, wherein the driving circuit includes a driving sub-circuit and a data writing sub-circuit, wherein the driving sub-circuit includes a driving transistor and a capacitor; a first terminal of the capacitor is coupled to the first voltage terminal, and a second terminal of the capacitor is coupled to a control electrode of the driving transistor;

the data writing sub-circuit is coupled to the scan signal terminal, the data signal terminal and the driving sub-circuit; the data writing sub-circuit is configured to write the data signal received at the data signal terminal into the driving sub-circuit in response to the scan signal received at the scan signal terminal; and the driving sub-circuit is configured to generate the driving signal according to the written data signal and the first voltage of the first voltage terminal.

5. The pixel circuit according to claim 4, where the data writing sub-circuit includes a third transistor, a control electrode of the third transistor is coupled to the scan signal terminal, a first electrode of the third transistor is coupled to the data signal terminal, and a second electrode of the third transistor is coupled to a first electrode of the driving transistor.

6. The pixel circuit according to claim 4, wherein the driving circuit further includes a driving control sub-circuit coupled to the enable signal terminal, the first voltage terminal, the driving sub-circuit and the control node; and the driving control sub-circuit is configured to cause the driving sub-circuit to form a conductive path with the first voltage terminal and the control node in response to the enable signal received at the enable signal terminal.

7. The pixel circuit according to claim 6, wherein the driving control sub-circuit includes:

a fourth transistor, wherein a control electrode of the fourth transistor is coupled to the enable signal terminal, a first electrode of the fourth transistor is coupled to the first voltage terminal, and a second electrode of the fourth transistor is coupled to a first electrode of the driving transistor; and a fifth transistor, wherein a control electrode of the fifth transistor is coupled to the enable signal terminal, a first electrode of the fifth transistor is coupled to a second electrode of the driving transistor, and a second electrode of the fifth transistor is coupled to the control node.

8. The pixel circuit according to claim 4, wherein the driving circuit further includes a compensation sub-circuit coupled to the scan signal terminal and the driving sub-circuit; and the compensation sub-circuit is configured to write the data signal and a threshold voltage of the driving transistor in the driving sub-circuit into the control electrode of the driving transistor in response to the scan signal received at the scan signal terminal.

9. The pixel circuit according to claim 8, wherein the compensation sub-circuit includes a sixth transistor, a control electrode of the sixth transistor is coupled to the scan signal terminal, a first electrode of the sixth transistor is coupled to the second electrode of the driving transistor, and a second electrode of the sixth transistor is coupled to the control electrode of the driving transistor.

10. The pixel circuit according to claim 4, wherein the driving circuit further includes a second reset sub-circuit coupled to a second reset signal terminal, a second initial signal terminal and the driving sub-circuit; and the second reset sub-circuit is configured to transmit a second initial signal received at the second initial signal terminal to the driving sub-circuit in response to a second reset signal received at the second reset signal terminal.

11. The pixel circuit according to claim 10, wherein the second reset sub-circuit includes a seventh transistor, a control electrode of the seventh transistor is coupled to the second reset signal terminal, a first electrode of the seventh transistor is coupled to the second initial signal terminal, and a second electrode of the seventh transistor is coupled to the driving sub-circuit.

12. A display panel, comprising:

pixel circuits according to claim 1; and elements to be driven each coupled to a pixel circuit of the pixel circuits and a second voltage terminal.

13. The display panel according to claim 12, further comprising a plurality of control signal lines, wherein the control signal terminal of the pixel circuit is coupled to a control signal line of the plurality of control signal lines; and the plurality of control signal lines are configured to transmit control signals.

14. The display panel according to claim 13, wherein the display panel comprises a plurality of sub-pixels, wherein a sub-pixel of the plurality of sub-pixels includes one of the pixel circuits and one of the elements to be driven;

pixel circuits in sub-pixels of a same color are coupled to a same control signal line.

15. A display device, comprising:

the display panel according to claim 12;

a driver chip coupled to the display panel, wherein the driver chip is configured to provide signals for the display panel.

16. A driving method of a pixel circuit, the pixel circuit including a driving circuit and a control circuit, the driving circuit being coupled to at least a first reset signal terminal, a first initial signal terminal, a scan signal terminal, a data signal terminal, a first voltage terminal, an enable signal terminal and a control node, the control circuit being coupled to a control signal terminal and the control node, the control circuit including a first transistor, a control electrode of the first transistor being coupled to the control node, a second electrode of the first transistor being coupled to the control node, a first electrode of the first transistor being coupled to the control signal terminal, and the first transistor being a P-type transistor, the driving method comprising:

transmitting, by the driving circuit, a first initial signal received at the first initial signal terminal to the control node in response to a first reset signal received at the first reset signal terminal;

writing, by the driving circuit, a data signal received at the data signal terminal in response to a scan signal received at the scan signal terminal;

generating, by the driving circuit, a driving signal according to a first voltage of the first voltage terminal and the written data signal in response to an enable signal received at the enable signal terminal;

outputting, by the driving circuit, the driving signal to an element to be driven that is coupled to the control node; and transmitting, by the control circuit, a control signal received at the control signal terminal to the control node in response to a voltage of the control node, so as to control a turned-on duration of the element to be driven in conjunction with the driving signal, wherein the first transistor of the control circuit is turned on in response to the voltage of the control node, so that the control signal received at the control signal terminal to the control node, wherein a voltage of the control signal is a low-level signal, a voltage of the first initial signal is a low-level signal, and the voltage of the control signal is greater than the voltage of the first initial signal.

* * * * *